(12) United States Patent
Liu et al.

(10) Patent No.: US 11,253,919 B2
(45) Date of Patent: Feb. 22, 2022

(54) TOUGHENED TIAL-BASED ALLOY SHEET WITH PERIODICALLY MISALIGNED THROUGH-HOLE TITANIUM ALLOY LAYERS AND PREPARATION METHOD THEREOF

(71) Applicant: SHAANXI UNIVERSITY OF TECHNOLOGY, Hanzhong (CN)

(72) Inventors: Fang Liu, Hanzhong (CN); Taotao Ai, Hanzhong (CN); Hongfeng Dong, Hanzhong (CN); Wenhu Li, Hanzhong (CN); Xinqiang Yuan, Hanzhong (CN); Zhifeng Deng, Hanzhong (CN); Jinhu Dong, Hanzhong (CN)

(73) Assignee: Shaanxi University of Technology, Hanzhong (CN)

( * ) Notice: Subject to any disclaimer, the term of this patent is extended or adjusted under 35 U.S.C. 154(b) by 120 days.

(21) Appl. No.: 16/565,600

(22) Filed: Sep. 10, 2019

(65) Prior Publication Data

US 2020/0298312 A1    Sep. 24, 2020

(30) Foreign Application Priority Data

Mar. 19, 2019 (CN) .......................... 201910207904.4

(51) Int. Cl.
*B32B 15/01* (2006.01)
*B32B 3/10* (2006.01)
*B22F 7/04* (2006.01)
*C22C 14/00* (2006.01)
*B22F 9/04* (2006.01)
*B22F 1/00* (2022.01)

(52) U.S. Cl.
CPC .............. *B22F 7/04* (2013.01); *B22F 1/0011* (2013.01); *B22F 9/04* (2013.01); *C22C 14/00* (2013.01); *B22F 2009/043* (2013.01); *B22F 2301/205* (2013.01); *B32B 3/10* (2013.01); *B32B 15/01* (2013.01)

(58) Field of Classification Search
None
See application file for complete search history.

*Primary Examiner* — Adam Krupicka
(74) *Attorney, Agent, or Firm* — Avek IP, LLC

(57) ABSTRACT

Some embodiments of the disclosure provide a toughened TiAl-based alloy sheet with periodically misaligned through-hole titanium alloy layers sequentially stacked together. A through structure is formed in the misaligned through-hole titanium alloy layer. Two openings of the through structure are respectively located on upper and lower surfaces of the titanium alloy layer. The misaligned opening position of the through structure is at a center position of a quadrangle formed by every four through holes in adjacent titanium alloy layers. The through structure is filled with a TiAl-based alloy. The TiAl-based alloy layers on adjacent sides of the titanium alloy layer are connected through the TiAl-based alloy in the through structure. The TiAl-based alloy layer is connected to the titanium alloy layer through a $Ti_3Al$ interface layer. The TiAl-based alloy and the titanium alloy in the through structure are connected through a $Ti_3Al$ interface layer.

8 Claims, 3 Drawing Sheets

TOUGHENED TIAL-BASED ALLOY SHEET WITH PERIODICALLY MISALIGNED THROUGH-HOLE TITANIUM ALLOY LAYERS AND PREPARATION METHOD THEREOF

CROSS REFERENCE TO RELATED APPLICATIONS

This application claims priority to Chinese application number 20191020790-4.4, filed on Mar. 19, 2019, the disclosure of which is incorporated by reference herein in its entirety.

FIELD OF THE DISCLOSURE

The disclosure relates generally to the field of advanced metal materials. More specifically, the disclosure relates to the field of a toughened TiAl-based alloy sheet with periodically misaligned through-hole titanium alloy layers and a preparation method thereof.

BACKGROUND

Titanium-Aluminum (TiAl) intermetallic compounds have excellent properties of metals and ceramics, and can replace high-temperature alloys such as nickel-based or cobalt-based alloys with high density to manufacture some aerospace structural components and rotating or reciprocating structural components of the ground power system, to greatly improve the thrust weight ratio and the fuel efficiency, and thus has important application prospects in the fields of aerospace, automotive technologies, et cetera. TiAl alloys have entered the practical stage so far. For example, in June 2006, the GE Company adopts the 4822 alloy (Ti-48Al-2Cr-2Nb) to manufacture the 6th- and 7th-stage low-pressure turbine blades of the GEnx engine, which is the first application of key structural components made of γ-TiAl alloys. In domestic, the University of Science and Technology Beijing has developed a high-temperature high-Nb—TiAl alloy, which is recognized as the "first case" for the development of high-temperature and high-performance TiAl alloy by the international authority in the TiAl alloy research field, Professor Young-Won Kim. The γ-TiAl alloy low-pressure turbine blades are manufactured by the Institute of Metal Research, Chinese Academy of Sciences with the precision casting method, and have been used in the Trent WB engine of the Rolls-Royce Group Plc, British, to complete 1,750 simulated flight cycle tests covering a major overhaul cycle. However, the research and application of TiAl-based alloys is limited by the room-temperature intrinsic brittleness, which makes it difficult to process and deform, greatly limiting its application fields.

However, in the prior art, the problem that the intensity-plasticity of the TiAl-based alloy is "inversed" with each other has become an important research direction in the field of metal materials at home and abroad.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides a toughened TiAl-based alloy sheet with periodically misaligned through-hole titanium alloy layers. The toughened TiAl-based alloy sheet includes TiAl-based alloy layers and misaligned through-hole titanium alloy layers sequentially stacked together. A through structure is formed in the misaligned through-hole titanium alloy layer. Two openings of the through structure are respectively located on upper and lower surfaces of the titanium alloy layer. The misaligned opening position of the through structure is at a center position of a quadrangle formed by every four through holes in adjacent titanium alloy layers. The through structure is filled with a TiAl-based alloy. The TiAl-based alloy layers on adjacent sides of the titanium alloy layer are connected through the TiAl-based alloy in the through structure. The TiAl-based alloy layer is connected to the titanium alloy layer through a $Ti_3Al$ interface layer. The TiAl-based alloy and the titanium alloy in the through structure are connected through the $Ti_3Al$ interface layer.

Optionally, the thickness of the TiAl-based alloy layer is independently 0.1-1.5 mm.

Optionally, the atomic ratio of Ti to Al in the TiAl-based alloy layer is (55-35):(45-65).

Optionally, the thickness of the titanium alloy layer is independently 0.05-0.3 mm.

Optionally, the material of the titanium alloy layer is a TA titanium alloy, a TB titanium alloy, or a TC titanium alloy.

Optionally, the opening of the through structure is circular or rectangular. When the opening of the through structure is circular, the diameter of the opening is 0.5-3 mm, and the distance between the centers of the two circles is 2-12 mm. When the opening of the through structure is rectangular, the opening has a length of 1-5 mm and a width of 0.2-1 mm, and the distance between the center points of the two rectangles is 3.5-7.5 mm.

Optionally, the thickness of the $Ti_3Al$ interface layer is independently 5-150 μm.

In other embodiments, the disclosure provides a preparation method of a toughened TiAl-based alloy sheet with periodically misaligned through-hole titanium alloy layers including the following steps. (1) Mixing a titanium powder, an aluminum powder, and an active agent to obtain a mixed powder. (2) Alternately stacking the mixed powder and titanium alloy sheets with a misaligned through structure layer by layer. (3) Filling the through structure with the mixed powder to obtain a green body. (4) Sintering the green body to obtain a toughened TiAl-based alloy sheet with periodically misaligned through-hole titanium alloy layers.

Optionally, the particle size of the titanium powder and the aluminum powder is 200 mesh or less.

Optionally, the sintering temperature is 1,000-1,200° C., the pressure is 1.5-3.5 t, and the time is 5-15 min.

In further embodiments, toughened titanium alloy layers are disposed between the TiAl-based alloy layers, and a biomimetic laminated structure is formed by laminating the toughened titanium alloy layers and the TiAl-based alloy layers. The misaligned connection between layers is formed due to the existence of a misaligned through structure in the titanium alloy layer, which helps to achieve a high-intensity and high-toughness effect. The experimental results show that the toughened TiAl-based alloy sheet with periodically misaligned through-hole titanium alloy layers has the bending intensity of 566.33-1087.65 MPa and the fracture toughness of 15.25-28.25 MPa·m$^{1/2}$ in the vertical lamination direction, and has the bending intensity of 794.48-1431.19

MPa and the fracture toughness of 19.02-37.28 MPa·m$^{1/2}$ in the parallel lamination direction.

DETAILED DESCRIPTION

Figure 1:
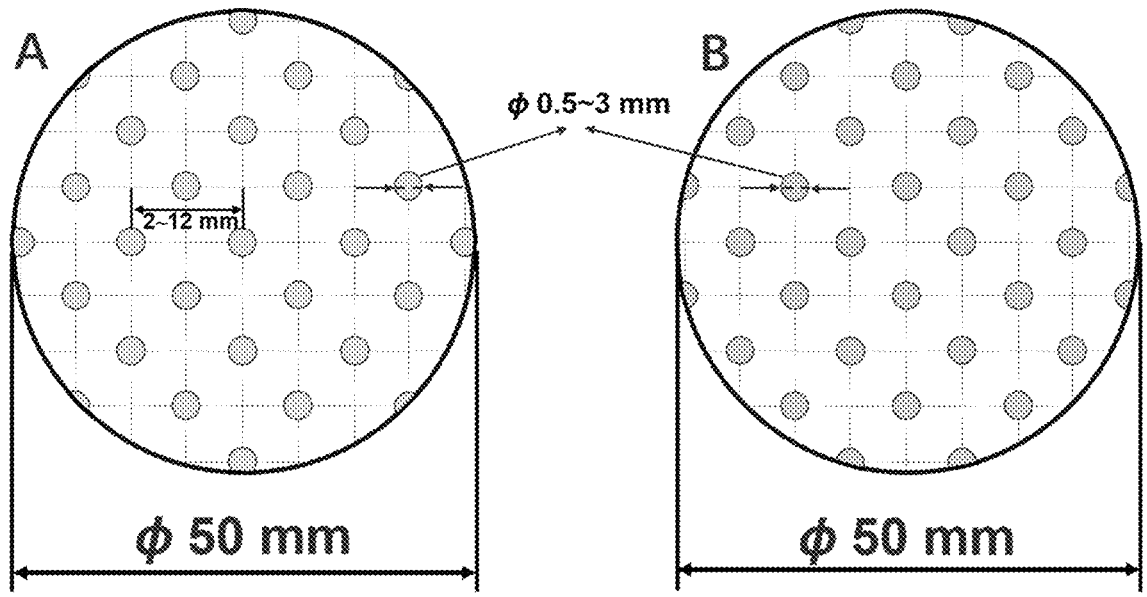
FIG. 1 shows a TC4 titanium alloy foil processing model and dimensions.

Some embodiments of the disclosure provide a toughened TiAl-based alloy sheet with periodically misaligned through-hole titanium alloy layers. The toughened TiAl-based alloy sheet includes TiAl-based alloy layers and misaligned through-hole titanium alloy layers sequentially stacked together. A through structure is formed in the misaligned through-hole titanium alloy layer. Two openings of the through structure are respectively located on upper and lower surfaces of the titanium alloy layer. The misaligned opening position of the through structure is at a center position of a quadrangle formed by every four through holes in adjacent titanium alloy layers. The through structure is filled with a TiAl-based alloy. The TiAl-based alloy layers on adjacent sides of the titanium alloy layer are connected through the TiAl-based alloy in the through structure. The TiAl-based alloy layer is connected to the titanium alloy layer through a Ti$_3$Al interface layer. The TiAl-based alloy and the titanium alloy in the through structure are connected through the Ti$_3$Al interface layer.

The thickness of the TiAl-based alloy layer is 0.1-1.5 mm, preferably 0.2-1 mm, more preferably 0.3-0.6 mm.

The atomic ratio of Ti to Al in the TiAl-based alloy layer is (55-35):(45-65).

The thickness of the titanium alloy layer is 0.05-0.3 mm, preferably 0.15-0.25 mm.

The material of the titanium alloy layer may be a TA titanium alloy, a TB titanium alloy, or a TC titanium alloy. The TA titanium alloy may be a TA5 titanium alloy or a TA10 titanium alloy. The TB titanium alloy may be a TB4 titanium alloy or a TB11 titanium alloy. The TC titanium alloy may be a TC4 titanium alloy or a TC20 titanium alloy. The titanium alloy layer is a toughened layer, which is overlapped with the TiAl-based alloy layer to form a laminated structure to improve the toughness of the alloy.

The number of the titanium alloy layers is not particularly defined, and may be adjusted according to the size requirement of the product. The number of the titanium alloy layer is 3-9, preferably 5-7. The number of the through-hole titanium alloy layers in the misaligned through-hole titanium alloy layer is at least 2.

In some embodiments, a misaligned through structure is disposed in the titanium alloy layer. The misaligned through structure is filled with a TiAl-based alloy. The TiAl-based alloy layers on adjacent sides of the titanium alloy layer are connected through the TiAl-based alloy in the through structure. The size and distribution of the through structure are not particularly limited, provided that the TiAl-based alloy layers on adjacent sides of the titanium alloy layer are in misaligned connection. The through structure is optionally a through hole penetrating vertically.

In other embodiments, the opening of the through structure is circular or rectangular. The diameter of the opening is 0.5-3 mm, preferably 1-2 mm, and the distance between the centers of the two circles is 2-12 mm, preferably 2-6 mm when the opening of the through structure is circular. The length of the opening is 1-5 mm, preferably 2-4 mm, and the width is 0.2-1 mm, preferably 0.3-0.6 mm, and the distance between the center points of the two rectangles is 3.5-7.5 mm, preferably 4-6 mm when the opening of the through structure is rectangular.

Optionally, the misaligned openings are arranged in a parallel dot matrix. The position of the misaligned opening of the through structure is at the center position of a quadrangle formed by every four through holes in adjacent titanium alloy layers, which may further ensure the formation of the misaligned connection force between layers.

Optionally, the TiAl-based alloy filled in the through structure includes TiAl and Ti$_3$Al, which may form the misaligned interconnection between the TiAl-based alloy layers, and improve the performance of the parallel lamination direction, so that the alloy has good toughness while maintaining high intensity.

Optionally, the thickness of the Ti$_3$Al interface layer is 5-150 μm, preferably 10-50 μm, more preferably 25 μm.

Optionally, the Ti$_3$Al interface layer enables good combination of the TiAl-based alloy and the titanium alloy, and fully exerts the toughness of the titanium alloy layer to achieve better coordination between the toughness and the intensity.

In further embodiments, the disclosure provides a preparation method of the toughened TiAl-based alloy sheet with periodically misaligned through-hole titanium alloy layers of the foregoing technical solution including the following steps. (1) Mixing a titanium powder, an aluminum powder, and an active agent to obtain a mixed powder. (2) Alternately stacking the mixed powder and titanium alloy sheets with a misaligned through structure layer by layer. (3) Filling the through structure with the mixed powder to obtain a green body. (4) Sintering the green body to obtain a toughened TiAl-based alloy sheet with periodically misaligned through-hole titanium alloy layers.

Optionally, the titanium powder, the aluminum powder, and the active agent are mixed to obtain a mixed powder. The active agent may be a positively charged cetyltrimethylammonium bromide. The dosage of the active agent is not particularly limited.

Optionally, the mass ratio of the titanium powder to the aluminum powder may be (48.86-68.44):(31.56-51.14). The titanium powder and the aluminum powder are spherical particles, and may be commercially available products well-known to a person skilled in the art. The particle size of the titanium powder and the aluminum powder is independently 200 mesh or less, preferably 100-150 mesh, more preferably 120 mesh.

In some embodiments, the operation of the mixing is ball milling, preferably wet ball milling. Optionally, the ball ratio of the ball milling is 3-5:1, preferably 4:1. The rotation speed of the ball milling is 300-500 r/min, preferably 350-450 r/min. The time of the ball milling is 30-60 min, preferably 40-50 min. An additive of the ball milling is an alcohol solution. The auxiliary means of the ball milling is ultrasonic stirring, and the frequency is 20-50 kHz. According to another embodiment, the ball milling uniformly mixes the titanium powder and the aluminum powder, and finally obtains a TiAl-based alloy having a uniform composition, thereby further improving the intensity and toughness of the alloy.

After the mixed powder is obtained, the method alternately stacks the mixed powder and the titanium alloy sheets with the misaligned through structure layer by layer, and fills the through structure with the mixed powder to obtain a green body.

The source of the titanium alloy sheet with the misaligned through structure is not particularly limited, provided that the titanium alloy sheet adopts a commercially available product or is prepared by according to the preparation method well-known to a person skilled in the art. The titanium alloy sheet with a misaligned through structure is obtained by drilling a titanium alloy sheet through a drilling machine. The drilling operation of the drilling machine is not particularly limited, provided that a desired through structure can be processed.

Upon completion of the drilling of the drilling machine, the method washes and dries the drilled product to obtain a titanium alloy sheet with a misaligned through structure. Optionally, the washing sequentially includes pickling, water washing, and acetone washing. The number of times of pickling, water washing and acetone washing is 1-2 independently. The pickling solution is a 10 wt. % HF solution. The washing may remove an oxide film on the processed surface to obtain a good interface.

The drying operation is not particularly limited, provided that a technical solution of metal drying well-known to a person skilled in the art may be employed. Optionally, the drying is vacuum drying. The vacuum degree of the drying vacuum is 0.1 Pa or less. The vacuum drying temperature is 25-40° C., preferably 30-35° C. The vacuum drying time is 30-60 min, preferably 40-50 min.

The shape and size of the titanium alloy sheet are not particularly limited, and may be adjusted according to the needs of the product. Optionally, the titanium alloy sheet is circular, and the diameter of the titanium alloy sheet is 30-50 cm.

The operation of stacking the mixed powder and the titanium alloy sheets with the misalignment through structure is not particularly limited, provided that the adjacent titanium alloy sheets form a misaligned lamination mode, and the position of the misaligned openings of each layer of the through structure is just at the center position of the quadrangle formed by every four through holes in the adjacent titanium alloy layers. Optionally, the stacking is carried out in a mold, and the material of the mold is graphite.

After the green body is obtained, the method sinters the green body to obtain a toughened TiAl-based alloy sheet with periodically misaligned through-hole titanium alloy layers.

In some embodiments, the sintering temperature is 1,000-1,200° C., preferably 1,050-1,150° C., more preferably 1150° C. The sintering pressure is 1.5-3.5 t, preferably 2.5 t. The sintering time is 5-15 min, preferably 5-10 min. The diffusion reaction occurs in a contact surface of the TiAl-based alloy and the titanium alloy in the sintering to form a $Ti_3Al$ interface layer.

In other embodiments, the sintering is hot-press sintering or spark plasma sintering, preferably spark plasma sintering. Optionally, the spark plasma sintering forms a skin current on the surface of the powder through a pulse current, and the discharge between the particles may generate plasmas to promote the organic combination between the powder and the titanium alloy to achieve rapid sintering densification, which not only retains the toughened titanium alloy layer, but also inhibits the formation of brittle phases and the thickness of the interface reaction layer, thereby greatly optimizing the laminated structure and improving the interface bonding effect.

In further embodiments, the process of raising the temperature to the sintering temperature optionally includes first heating and second heating in sequence. The heating rate of the first heating is 45-55° C./min, preferably 50° C./min. The end temperature of the first heating is 850-950° C., preferably 900° C. The heating rate of the second heating is 100-200° C./min, preferably 125° C./min. The end temperature of the second heating is optionally the sintering temperature. The first heating and the second heating enable rapid bonding between the powder layer and the titanium alloy layer, thereby suppressing the grain growth and the interface layer thickness.

The pressurization rate is not particularly limited, provided that a stepwise pressurization mode well-known to a person skilled in the art is employed. The pressure reaches the sintering pressure optionally when heated to the sintering temperature.

Upon completion of the sintering, the present disclosure cools the obtained sintered product to obtain a toughened TiAl-based alloy sheet with periodically misaligned through-hole titanium alloy layers. The cooling mode is not particularly limited, provided that a furnace cooling solution well-known to a person skilled in the art is employed.

The following describes some non-limiting exemplary embodiments of a toughened TiAl-based alloy sheet with periodically misaligned through-hole titanium alloy layers and the preparation method thereof with references to the accompanying drawings. The described embodiments are merely a part rather than all of the embodiments of the invention. All other embodiments obtained by a person of ordinary skill in the art based on the embodiments of the disclosure shall fall within the scope of the disclosure.

Embodiment 1

Figure 2:
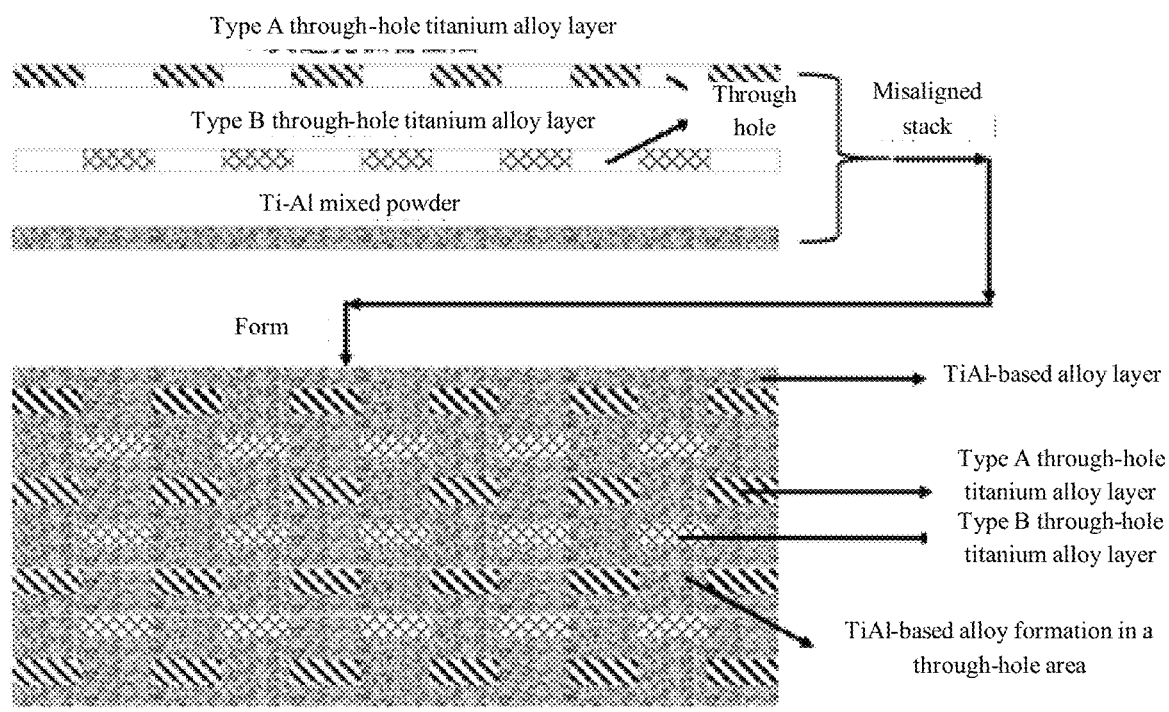
FIG. 2 shows a laminated structure stacking mode of a toughened TiAl-based alloy sheet with periodically misaligned through-hole titanium alloy layers.

FIG. 1 is a schematic diagram showing a TC4 titanium alloy foil processing model (type A and type B circular through holes on the left side and right side) and dimensions. The type A and type B through holes are used for reflecting the misaligned through holes. FIG. 2 is a schematic diagram showing a stacking mode of a laminated structure of a toughened TiAl-based alloy sheet with periodically misaligned through-hole titanium alloy layers.

(1) As shown in FIG. 1, the TC4 titanium alloy (Ti-6Al-4V) sheet with 150 mm and the thickness of 0.3 mm is drilled by a drilling machine according to the pore distribution design structure of FIG. 1 to form a circular hole through structure with the diameter of 0.5-3 mm, the spacing between the through structures is 2-12 mm, and then the surface oxide film is pickled with the 10 wt % HF solution, washed with distilled water, rinsed with acetone, and dried in vacuum at the vacuum degree of 0.05 Pa and the temperature of 30° C. for 30 min.

(2) The powder is weighed according to 52Ti-48Al (at %), and is subjected to wet ball milling by a ball milling in a ball ratio of 4:1 at the rotation speed of 350 r/min for 40 min. The ball milling additive is a positively charged cetyltrimethylammonium bromide and an alcohol solution. The ball-milled power is stirred with ultrasonic waves before mixing at the frequency of 40 kHz, dried in vacuum after the mixing at the vacuum degree of 0.1 Pa and the drying temperature of 30° C. for 50 min, and then screened with a 200-mesh sieve for later use.

(3) As shown in FIG. 2, the treated titanium alloy sheet and the 52Ti-48Al (at %) mixed powder are stacked layer by layer in the graphite mold, and the stacking process ensures the formation of misaligned lamination, that is, the position of the misaligned opening of each layer of the through structure is just at the center position of the quadrangle formed by every four through holes in the adjacent titanium alloy layers. Seven titanium alloy foils are designed, and a sample is prepared by a spark plasma sintering system. The sintering process is: raising the room temperature to 900° C. at the heating rate of 50° C./min, then raising the temperature to 1,150° C. at the heating rate of 125° C./min, and finally keeping the temperature at 1,150° C. for 10 min, where the forming pressure is 2.5 t. With the natural furnace cooling, the toughened TiAl-based alloy sheet with periodically misaligned through-hole titanium alloy layers may be obtained, and the total thickness of the sample is controlled at 6 mm.

The toughened TiAl-based alloy sheet with periodically misaligned through-hole titanium alloy layers (with the length of 50 mm) prepared in this embodiment is subjected to a mechanical property test. FIG. 2 further shows that no fracture occurs to the sample after the mechanical property test, which indicates that the titanium alloy foil has good reinforcing and toughening functions. Only the sample subjected to vertical lamination force cracks, and is a fracture toughness test piece, which indicates that the crack is fractured along the layer bonding surface.

Figure 3:
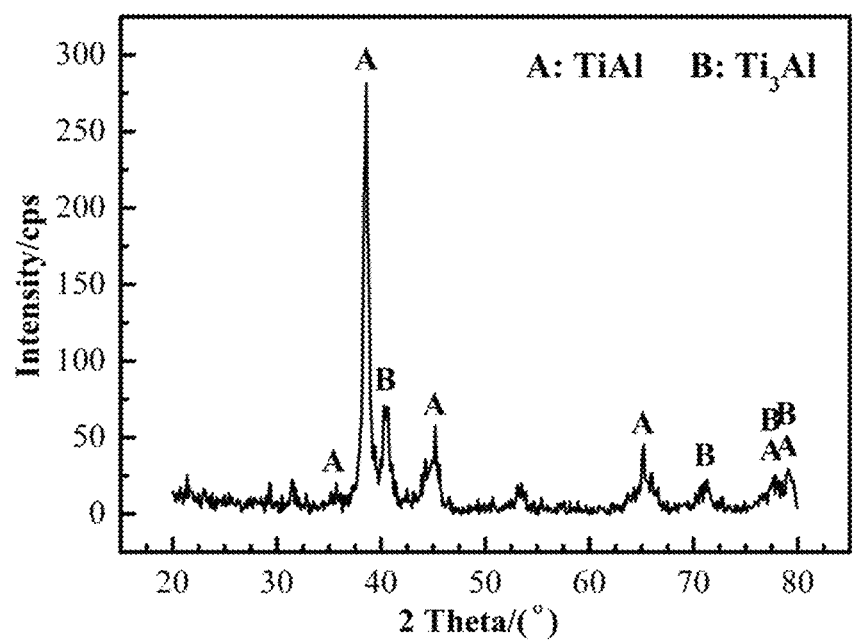
FIG. 3 shows an XRD pattern of a toughened TiAl-based alloy sheet with periodically misaligned through-hole titanium alloy layers.
Figure 4:
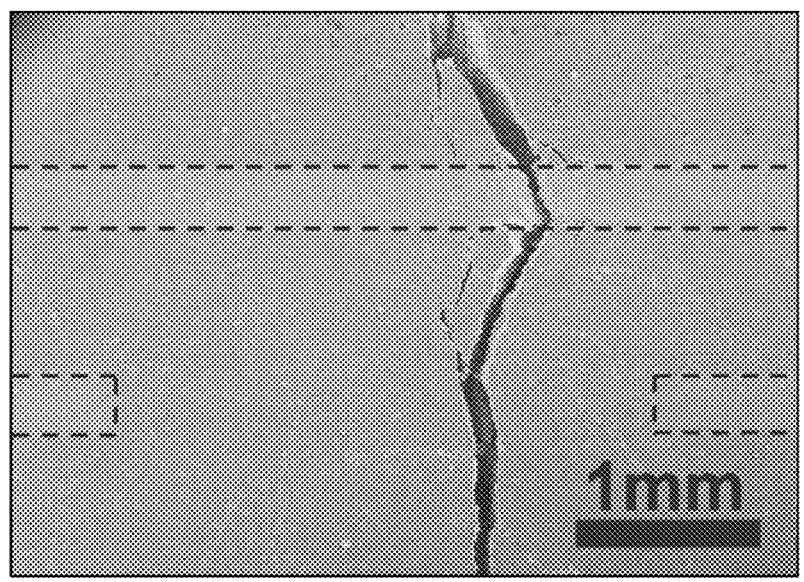
FIG. 4 shows an SEM image of a toughened TiAl-based alloy sheet with periodically misaligned through-hole titanium alloy layers.

The XRD pattern and the SEM image of the toughened TiAl-based alloy sheet with periodically misaligned through-hole titanium alloy layers prepared in this embodiment are as shown in FIGS. 3 and 4. FIG. 3 shows that the alloy mainly consists of $Ti_3Al$ and TiAl phases. The through holes are clearly observed from FIG. 4.

The mechanical properties of the toughened TiAl-based alloy sheet with periodically misaligned through-hole titanium alloy layers prepared in this embodiment are as shown in the Table. The three-point bending method is adopted to measure the bending intensity of the toughened TiAl-based alloy sheet with periodically misaligned through-hole titanium alloy layers in the vertical laminated structure direction to be 945.78 MPa, and the bending intensity in the parallel laminated structure direction to be 1244.51 MPa. The three-point bending Single Edge Notch Beam (SENB) method is adopted to measure the fracture toughness in the vertical laminated structure direction of 25.68 $MPa \cdot m^{1/2}$, and the fracture toughness in the parallel laminated structure direction to be 33.89 $MPa \cdot m^{1/2}$.

Embodiment 2

Compared with Embodiment 1, the only difference is that five layers of titanium alloy foils are designed.

The mechanical properties of the toughened TiAl-based alloy sheet with periodically misaligned through-hole titanium alloy layers prepared in this embodiment are as shown in the Table. The three-point bending method is adopted to measure the bending intensity of the toughened TiAl-based alloy sheet with periodically misaligned through-hole titanium alloy layers in the vertical laminated structure direction to be 566.33 MPa, and the bending intensity in the parallel laminated structure direction to be 794.48 MPa. The three-point bending SENB method is adopted to measure the fracture toughness in the vertical laminated structure direction of 15.25 $MPa \cdot m^{1/2}$, and the fracture toughness in the parallel laminated structure direction to be 19.02 $MPa \cdot m^{1/2}$.

Embodiment 3

Figure 5:
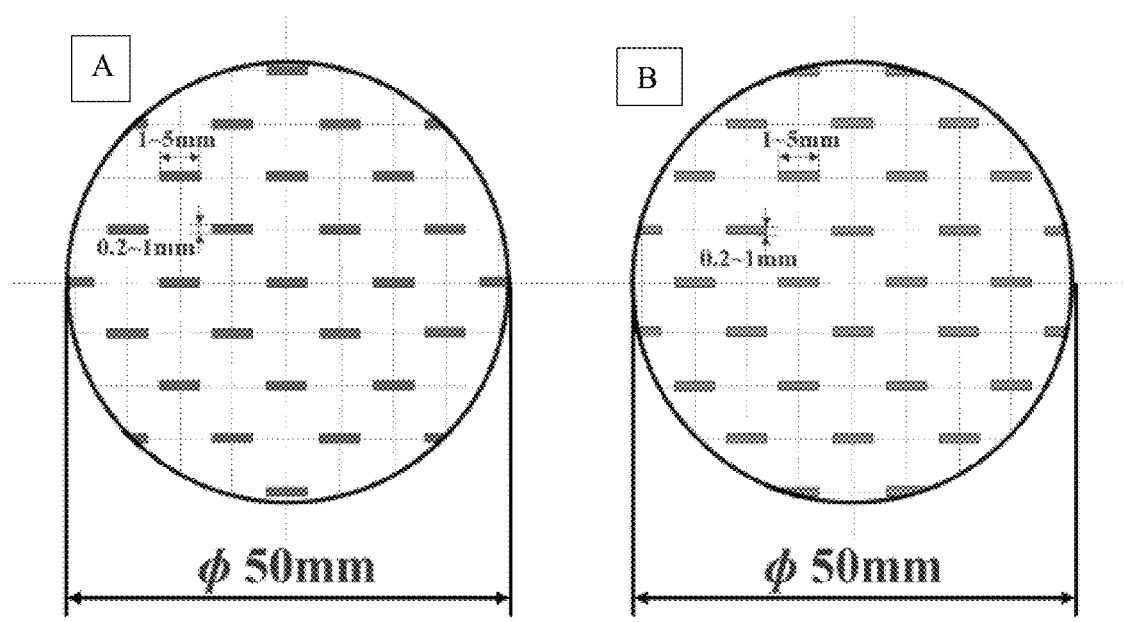
FIG. 5 shows another TC4 titanium alloy foil processing model and dimensions.

FIG. 5 is a schematic diagram showing another TC4 titanium alloy foil processing model (type A and type B rectangular through holes on the left side and right side) and dimensions. The type A and type B through holes are used for reflecting the misaligned through holes.

(1) As shown in FIG. 5, the TC4 titanium alloy (Ti-6Al-4V) sheet with 150 mm and the thickness of 0.3 mm is drilled by a drilling machine according to the pore distribution design structure of FIG. 5 to form a circular hole through structure with the length of 1-5 mm and the width of 0.2-1 mm, the spacing between the through structures is 3.5-7.5 mm, and then the surface oxide film is pickled with the 10 wt % HF solution, washed with distilled water, rinsed with acetone, and dried in vacuum at the vacuum degree of 0.05 Pa and the temperature of 30° C. for 30 min.

(2) The powder is weighed according to 52Ti-48Al (at %), and is subjected to wet ball milling by a ball milling in a ball ratio of 4:1 at the rotation speed of 350 r/min for 40 min. The ball milling additive is a positively charged cetyltrimethylammonium bromide and an alcohol solution. The ball-milled power is stirred with ultrasonic waves before mixing at the frequency of 40 kHz, dried in vacuum after the mixing at the vacuum degree of 0.1 Pa and the drying temperature of 30° C. for 50 min, and then screened with a 200-mesh sieve for later use.

(3) As shown in FIG. 2, the treated titanium alloy sheet and the 52Ti-48Al (at %) mixed powder are stacked layer by layer in the graphite mold, and the stacking process ensures the formation of misaligned lamination, that is, the position of the misaligned opening of each layer of the through structure is just at the center position of the quadrangle formed by every four through holes in the adjacent titanium alloy layers. Nine titanium alloy foils are designed, and a sample is prepared by a spark plasma sintering system. The sintering process is: raising from the room temperature to 900° C. at the heating rate of 50° C./min, then raising the temperature to 1,150° C. at the heating rate of 125° C./min, and finally keeping the temperature at 1,150° C. for 10 min, where the forming pressure is 2.5 t. With the natural furnace cooling, the toughened TiAl-based alloy sheet with periodically misaligned through-hole titanium alloy layers may be obtained, and the total thickness of the sample is controlled at 6 mm.

The mechanical properties of the toughened TiAl-based alloy sheet with periodically misaligned through-hole titanium alloy layers prepared in this embodiment are as shown in the Table. The three-point bending method is adopted to measure the bending intensity of the toughened TiAl-based alloy sheet with periodically misaligned through-hole titanium alloy layers in the vertical laminated structure direction to be 1087.65 MPa, and the bending intensity in the parallel laminated structure direction to be 1431.19 MPa. The three-point bending SENB method is adopted to measure the fracture toughness in the vertical laminated structure direction of 28.25 $MPa \cdot m^{1/2}$, and the fracture toughness in the parallel laminated structure direction to be 37.28 $MPa \cdot m^{1/2}$.

TABLE

The mechanical properties of the toughened TiAl-based alloy sheet with periodically misaligned through-hole titanium alloy layers.

| Embodiment: | Flexure intensity/MPa | | Fracture toughness/MPa · m$^{1/2}$ | |
|---|---|---|---|---|
| | Vertical lamination | Parallel lamination | Vertical lamination | Parallel lamination |
| 1 (seven layers) | 945.78 | 1244.51 | 25.68 | 33.89 |
| 2 (five layers) | 566.33 | 794.48 | 15.25 | 19.02 |
| 3 (nine layers) | 1087.65 | 1431.19 | 28.25 | 37.28 |

Various embodiments of the disclosure may have one or more of the following effects. The disclosure may provide a laminated TiAl-based alloy sheet, which can fully utilize the synergistic, coupling and multi-functional response mechanisms of different components in the material on the basis of the intrinsic properties of the material components. The laminated TiAl-based alloy sheet as disclosed may improve the comprehensive performance of the material to a certain extent, so that the material can increase the intensity and rigidity, and the toughness and plasticity are also greatly improved. The special laminated structure may achieve energy dissipation, reduce the stress concentration at the crack tip, and make the multi-interface structure have better toughening effect. The toughened titanium alloy layers may be disposed between the TiAl-based alloy layers, and a biomimetic laminated structure may be formed by laminating the toughened titanium alloy layers and the TiAl-based alloy layers. The misaligned connection between layers may be formed due to the existence of a misaligned through structure in the titanium alloy layer, which may achieve a high-intensity and high-toughness effect. The experimental results show that the toughened TiAl-based alloy sheet with periodically misaligned through-hole titanium alloy layers provided has a bending intensity of 566.33-1087.65 MPa and a fracture toughness of 15.25-28.25 MPa·m$^{1/2}$ in the vertical lamination direction, and has a bending intensity of 794.48-1431.19 MPa and a fracture toughness of 19.02-37.28 MPa·m$^{1/2}$ in the parallel lamination direction, which are superior to the intensity and toughness of the titanium alloy sheet in the prior art, for example, the flexure intensity of 431.81 MPa and the fracture toughness of 9.22 MPa m$^{1/2}$ disclosed by Chao Wu et al. ("Micro-structure, mechanical properties and comparison of monolithic and laminated Ti—B4C composite with Al doped." Journal of Alloys and Compounds, 2018, 733: 1-7), and the vertical laminated flexure intensity of 410 MPa and the parallel laminated fracture toughness of 28.2 MPa m$^{1/2}$ disclosed by Chunfa Lin et al. ("Microstructure evolution and fracture behavior of innovative Ti—(SiC$_f$/Al$_3$Ti) laminated composites." Journal of Alloys and Compounds, 2018, 743:52-62).

The foregoing descriptions are merely exemplary implementations of the present invention rather than limitations on the present invention in any form. It should be pointed out that for a person of ordinary skilled in the art, several improvements and modifications may further be made without departing from the principle of the present invention, and the improvements and modifications should also be considered to fall within the protection scope of the present invention.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A toughened TiAl-based alloy sheet with periodically misaligned through-hole titanium alloy layers, comprising:
    TiAl-based alloy layers and misaligned through-hole titanium alloy layers sequentially stacked together;
    wherein:
        through holes are formed in each of the misaligned through-hole titanium alloy layers;
        two openings of each of the through holes are respectively located on upper and lower surfaces of each of the misaligned through-hole titanium alloy layers;
        through holes in one layer of the misaligned through-hole titanium alloy layers are staggered with respect to through holes in another layer of the misaligned through hole titanium alloy layers adjacent to the one layer such that the through holes in the one layer are respectively arranged near centers of quadrangles formed by every four adjacent through holes arranged in rectangular shapes in the other layer;
        the through holes of the misaligned through-hole titanium alloy layers are filled with TiAl-based alloy;
        adjacent TiAl-based alloy layers on upper and lower sides of each of the misaligned through-hole titanium alloy layers are connected through the TiAl-based alloy in the through holes;
        each TiAl-based alloy layer is connected to a corresponding misaligned through-hole titanium alloy layer through a first Ti$_3$Al interface layer; and
        the TiAl-based alloy in the through holes and the misaligned through-hole titanium alloy layers are connected through a second Ti$_3$Al interface layer.

2. The toughened TiAl-based alloy sheet with periodically misaligned through-hole titanium alloy layers according to claim 1, wherein a thickness of each of the TiAl-based alloy layers is independently 0.1-1.5 mm.

3. The toughened TiAl-based alloy sheet with periodically misaligned through-hole titanium alloy layers according to claim 1, wherein an atomic ratio of Ti to Al in the TiAl-based alloy layers is (55-35):(45-65).

4. The toughened TiAl-based alloy sheet with periodically misaligned through-hole titanium alloy layers according to claim 1, wherein a thickness of each of the misaligned through-hole titanium alloy layers is independently 0.05-0.3 mm.

5. The toughened TiAl-based alloy sheet with periodically misaligned through-hole titanium alloy layers according to claim 1, wherein the misaligned through-hole titanium alloy layers are made of TA titanium alloy, TB titanium alloy, or TC titanium alloy.

6. The toughened TiAl-based alloy sheet with periodically misaligned through-hole titanium alloy layers according to claim 1, wherein:
    both openings of each of the through holes are circular;
    diameters of the openings are 0.5-3 mm; and distances between centers of two adjacent openings on a same surface of the misaligned through-hole titanium alloy layers are 2-12 mm.

7. The toughened TiAl-based alloy sheet with periodically misaligned through-hole titanium alloy layers according to claim 1, wherein:
both openings of each of the through holes are rectangular;
the openings have a length of 1-5 mm and a width of 0.2-1 mm;
and distances between center points of two adjacent openings on a same surface of the misaligned through-hole titanium alloy layers are 3.5-7.5 mm.

8. The toughened TiAl-based alloy sheet with periodically misaligned through-hole titanium alloy layers according to claim 1, wherein a thickness of at least one of the first $Ti_3Al$ interface layer and the second $Ti_3Al$ interface layer is independently 5-150 μm.

* * * * *